United States Patent [19]

Shiba et al.

[11] Patent Number: 5,051,973
[45] Date of Patent: Sep. 24, 1991

[54] METHOD FOR PLAYING BACK MUSIC PIECES RECORDED ON RECORDING MEDIA

[75] Inventors: Takahumi Shiba; Kunio Matsumoto, both of Tokorozawa, Japan

[73] Assignee: Pioneer Electronic Corporation, Tokyo, Japan

[21] Appl. No.: 245,221

[22] Filed: Sep. 16, 1988

[30] Foreign Application Priority Data

Dec. 19, 1987 [JP] Japan .................. 62-322506

[51] Int. Cl.$^5$ ........................................... G11B 17/22
[52] U.S. Cl. ...................................... 369/36; 369/27; 369/30
[58] Field of Search ................. 369/27, 30, 32, 33, 369/36, 34

[56] References Cited

U.S. PATENT DOCUMENTS

| 4,667,314 | 5/1987 | Iwashima | 369/34 X |
| 4,703,465 | 10/1987 | Parker | 369/30 |
| 4,750,106 | 6/1988 | Aiken, Jr. | 364/200 |
| 4,779,252 | 10/1988 | Custers et al. | 369/30 X |
| 4,792,934 | 12/1988 | Masaki | 369/36 X |
| 4,841,506 | 6/1989 | Kiyoura et al. | 369/36 X |
| 4,855,842 | 8/1989 | Hayes et al. | 369/32 X |
| 4,899,326 | 2/1990 | Takeya et al. | 369/33 X |

FOREIGN PATENT DOCUMENTS

| 0157869 | 9/1984 | Japan | 369/30 |
| 0083984 | 4/1988 | Japan | 369/30 |
| 0087684 | 4/1988 | Japan | 369/30 |

Primary Examiner—Benjamin R. Fuller
Assistant Examiner—Randy W. Gibson
Attorney, Agent, or Firm—Foley & Lardner

[57] ABSTRACT

A method for performing playbacks of pieces of music recorded on recording media, in which a subsequent piece of music to be played back is randomly selected among pieces of music which do not correspond to any playback-inhibition identification numbers nor any playback-completion identification numbers both of which have been already stored in a memory. The memory includes two regions "A" and "B", in which "A" are stored the playback-completion identification numbers, and in which "b" are stored the playback-inhibition identification numbers. Immediately before the randomly-selected playback is produced, the identification numbers stored in the region "B" are transferred to the region "A" so that the subsequent piece of music is randomly selected among the pieces of music which do not correspond to the identification numbers of which are not stored in the region "A", whereby the randomly-selected playback can be repeated, without necessity of repeated procedure for designating any music pieces which are prohibited from being played back.

6 Claims, 2 Drawing Sheets

METHOD FOR PLAYING BACK MUSIC PIECES RECORDED ON RECORDING MEDIA

BACKGROUND OF THE INVENTION

1. Field of the Invention

The present invention relates to a method for playing back a plurality of pieces of music recorded on a recording medium, and more particularly to a method for randomly playing back a plurality of pieces of music recorded on a recording medium such as a digital audio disc and an audio tape.

2. Description of the Prior Art

The so-called multi-disk player has recently been developed to which a plurality of magazines are detachably mounted. Each magazine holds therein a plurality of digital audio disks each records a plurality of pieces of music to be played back in a suitable manner such as a sequential manner in which a plurality of the disks are sequentially played back in the order of their original arrangement (hereinafter referred to the sequential playback). A programmed manner in which a plurality of the disks are played back in a predetermined sequence different from the order of their original arrangement, which is hereinafter referred to as the programmed playback). A random playback mode based on random-numbers which may be generated by using a table of random numbers or the like is hereinafter referred to as the randomly-selected playback.

In case of the randomly-selected playback being produced in the multi-disk player, a piece of music having been already played back may be selected again in producing playbacks since a piece of music is randomly selected in accordance with a random-number source such as the table of random numbers. Therefore, in order to prevent the same piece of music from being played back again, identification numbers, or alphabets etc., for identifying a plurality of pieces of music having been already played back (hereinafter referred to as the playback-completion identification numbers) are sequentially stored in a memory of the multi-disk player, to make it possible to randomly select a subsequent piece of music to be played back among a plurality of pieces of music the playback-completion identification numbers of which are still not stored in the memory of the multi-disk player. In some multi-disk player, the user can previously designate some pieces of music as undesirable ones requested not be to played back, through a delete-designation procedure. Identification numbers for identifying such undesirable ones will be hereinafter referred to as the playback-inhibition identification numbers which are stored in the memory of the multi-disk player to make it possible to randomly select a subsequent piece of music to be played back among a plurality of pieces of music which do not correspond to any playback-inhibition identification numbers which are stored in the memory of the multi-disk player.

Hitherto, in the multi-disk player providing the above-mentioned random selections, both of the playback-inhibition identification numbers and the playback-completion identification numbers are stored in the same region of the memory of the multi-disk player, so that the entire informations having been stored in the memory are cleared from the memory upon completion of the randomly-selected playback. As a result, in case of performing the randomly-selected playback again (hereinafter referred to as the repeat randomly-selected playback), it is necessary for the operator to perform the above-mentioned delete-designation procedure again. However, such procedure is very cumbersome. This has been a disadvantage inherent to the conventional multi-disk player.

SUMMARY OF THE INVENTION

It is an object of the present invention to provide a method for playing back a plurality of pieces of music recorded on recording media, which method enables the user to enjoy the repeat randomly-selected playbacks without necessity of repeated operations for the cumbersome delete-designation procedure.

According to the present invention, there is provided: a method for producing playbacks of a plurality of pieces of music recorded on recording media, said playbacks being randomly-selected playbacks in which a subsequent piece of music to be played back is randomly selected among a plurality of pieces of music which do not correspond to any of the playback-inhibition identifying numbers and the playback-completion identifying numbers both of which have been already stored in a memory, wherein:

said memory is provided with a first region for storing therein both of the playback-inhibition identification numbers and the playback-completion identification numbers, and a second region for storing only the playback-inhibition identification numbers therein;

said playback-inhibition identification numbers, having been stored in said first region of said memory are transferred to said first region of said memory so as to be stored therein immediately before producing the randomly-selected playbacks; and said subsequent piece of music to be played back is randomly selected among a plurality of pieces of music which correspond to the remaining identification numbers other than those stored in said first region of said memory.

DESCRIPTION OF THE PREFERRED EMBODIMENTS

Figure 1:
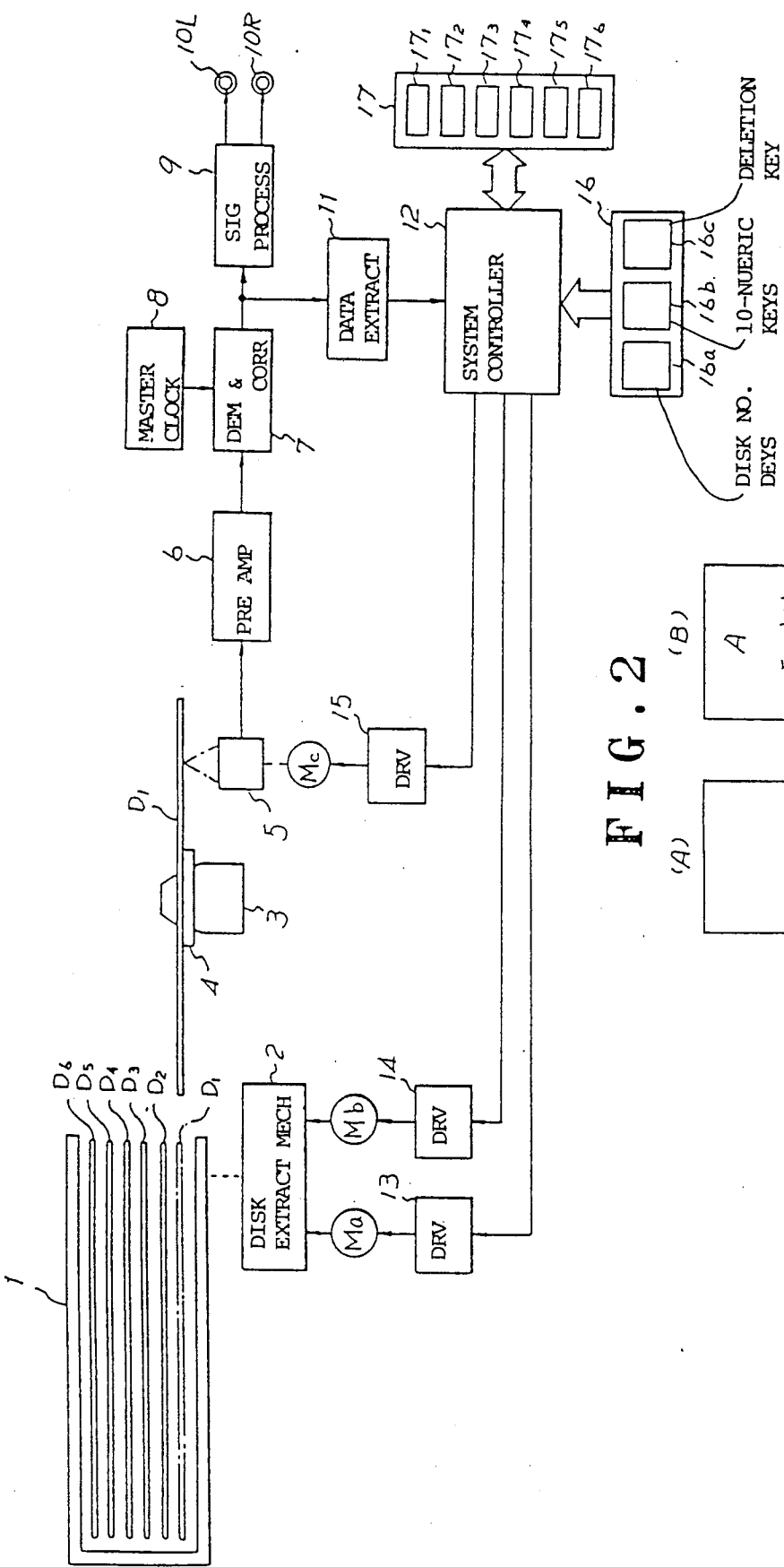
FIG. 1 is a schematic block diagram showing a multi-disk player for playing back a plurality of pieces of music recorded on recording disks and, which can be used for carrying out the method according to the present invention.

FIG. 1 shows a multi-disk player for playing back a plurality of pieces of music recorded on the so-called compact disks. As shown in FIG. 1, a magazine 1 carries a plurality of trays, for example, six trays (not shown) therein, the trays being arranged in a stacked manner and spaced apart form each other at intervals of a predetermined distance, while held projectable and retractable in the magazine 1. These trays carry six disks $D_1$ to $D_6$, respectively. The magazine 1 is detachably mounted in a predetermined mount portion of a main body, or housing of the player. In the multi-disk player shown in FIG. 1, a disk unloading and conveying mechanism 2 selects a desired disk such as $D_1$ from the disks $D_1$ to $D_6$ from the magazine 1 to unload and convey the disk $D_1$ to a turntable 4 fixed to a rotary shaft of a spindle motor 3. The thus conveyed disk $D_1$ is then clamped on the turntable 4.

The disk unloading and conveying mechanism 2 comprises: a disk-unloading member for selecting and unloading a desired one of the trays from the magazine 1 so that a desired disk of the disks $D_1$ to $D_6$ housed in the tray 1 is conveyed to the turntable 4; a clamp mechanism (not shown) for clamping the thus conveyed disk $D_1$ on the turntable 4; a transferring plate (not shown) for changing the position of the magazine 1 in a stacking direction of the disks $D_1$ to $D_6$ stacked in the magazine 1, relative to the turntable 4; and sensors (not shown) for detecting the position of the transferring plate and for detecting the clamp mechanism in its operation. In the disk unloading and conveying mechanism 2 having the above-mentioned construction, the transferring plate is driven by a motor $M_a$. On the other hand, the disk-unloading member is driven by a motor $M_b$. The position of the disk-unloading member is changed by driving the transferring plate, so as to make it possible to select a desired one of the disks $D_1$ to $D_6$. The magazine 1 and the disk unloading and conveying mechanism 2 are, for example, disclosed in a detail in a Japanese Patent Laid-Open No. 62-14369.

As shown in FIG. 1, an optical pickup unit 5 of the multi-disk player reads information, i.e. music pieces, recorded on the selected disk $D_1$ which is rotatably driven by the spindle motor 3. The optical pickup unit 5 usually includes: a laser diode functioning as a light source unit; an optical system comprising an objective lens; a photo-detector for receiving a light beam reflected from the disk $D_1$; a focus actuator for controlling the position of the objective lens along its optical axis with respect to an information-recorded surface of the disk $D_1$; and a tracking actuator for controlling the position of the light beam in a radial direction of the disk $D_1$, the beam being so issued from the pickup unit 5 as to be directed to a target record track on the disk $D_1$. The optical pickup unit 5 is mounted on a carriage (not shown) which is movable in a radial direction of the disk $D_1$, while driven by a motor $M_c$.

A read-out output signal issued from the optical pickup unit 5 is supplied to a demodulator and correction circuit 7 through a pre-amplifier 6. Then, the thus issued read-out output signal, which constitutes EFM (Eight to Fourteen Modulation) signal, is subjected to EFM demodulation in the demodulator and correction circuit 7, and the thus demodulated signals are stored in a memory (not shown) such as RAM or the like. The data thus stored in the memory is subjected to a data processing in synchronization with a master clock signal issued from a master clock circuit 8, so that deinterlaeving operation of the data and error correction of the data through the so-called parity check are conducted. The thus obtained digital audio signal from the demodulation and correction circuit 7 is processed through a signal processor circuit 9 comprising a digital-to-analog (D/A) converter, a deglitcher and the like, while being directly supplied to a data extractor circuit 11. The digital audio signal processed in the signal processor circuit 9 is then supplied to left and right audio output terminals of left and right channels 10L and 10R. In the data extractor circuit 11, the so-called sub-code data are extracted. The thus extracted sub-code data are supplied to a system controller 12.

Figure 2:
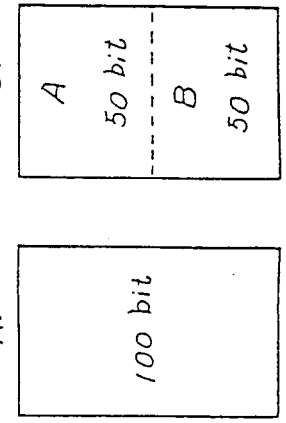
FIG. 2(A) is a view illustrating a regional construction of the memory employed in the multi-disk player shown in FIG. 1, for performing a normal randomly-selected playback mode.
FIG. 2(B) is a view illustrating a regional construction of the memory employed in the multi-disk player shown in FIG. 1, for performing a randomly-selected playbacks with deletion of undesirable pieces of music (hereinafter referred to the deletion randomly-selected playback mode) according to the present invention.

The system controller 12 is composed of microcomputers, which controls the motors $M_a$, $M_b$ and $M_c$ through driving circuits 13, 14 and 15 respectively so as to perform either one of the sequential playback mode, programmed playback mode and the randomly-selected playback mode in the multi-disk player. When the randomly-selected playback mode is produced in the multi-disk player, it is possible for the user to designate undesired pieces of music which are not to be played back by means of disk-number keys 16a, 10-numeric keys 16b and a deletion key 16c of a keyboard 16. Namely, a disk number and a music piece number corresponding to an undesired piece of music is designated by means of these keys 16a and 16b, and then the deletion key 16c is depressed by the user. The memory 17 is composed of six memory units $17_1$ to $17_6$ corresponding to the six disks $D_1$ to $D_6$, respectively. Each of the memory units $17_1$ to $17_6$ has, for example, 100 bits in capacity. When the playback of a piece of music is completed, an identification number of such one piece of music having been already played back is written in the corresponding one of the memory units $17_1$ to $17_6$ so as to prevent such one piece of music from being played back again. Thereafter, a subsequent piece of music to be played back is selected among a plurality of pieces of music which are still not played back, on the basis of the random-number source such as the table of random numbers or the like. As shown in FIG. 2(A), in the normal randomly-selected playback mode, the identification members of the pieces of music having been already played back are stored in the entire regions of the memory units $17_1$ to $17_6$ of the memory 17. On the other hand, as shown in FIG. 2(B), in the deletion randomly-selected playback mode for playing back a piece of music selected among a plurality of pieces of music which are still not played back nor deleted through the delete-designation procedure, the entire region of each of the memory units $17_1$ to $17_6$ is partitioned into two regions "A" and "B" each of which has 50 bits in capacity. Namely, the identification numbers of the pieces of music having been already played back are stored in the region "A" of each of the memory units $17_1$ to $17_6$, while the identification numbers of the undesirable pieces of music requested not to be played back are stored in the region "B" of each of the memory units $17_1$ to $17_6$. Each of the regions "A" and "B" is composed of a plurality of unit regions (bit) with addresses respectively corresponding to a plurality of names of the pieces of music, for example, corresponding to 50 number of names of the pieces of music. Namely, when the unit region (bit) corresponding to a name of a piece of music is set at a logic "1" of a binary digit, such name of the piece of music is stored in the memory units $17_1$ to $17_6$. Since the entire region of each of the memory units $17_1$ to $17_6$ is partitioned into two regions "A" and "B" as described above, the maximum number of pieces of music stored in each of the regions "A" and "B" is limited to 50 number of pieces. Such capacity of each of the regions "A" and "B" is not essential to the present invention.

Now, the flowchart of the program governing the processor of the system controller 12 for controlling the randomly-selected playbacks in the multi-disk player shown in FIG. 1 will be hereinbelow described in detail with reference to FIG. 3. In the deletion randomly-selected playbacks, the delete-designation procedure is previously carried out so that the identification numbers corresponding to the undesirable pieces of music requested not to be played back have been already stored in the regions "B" of the memory units $17_1$ to $17_6$ in bits.

Figure 3:
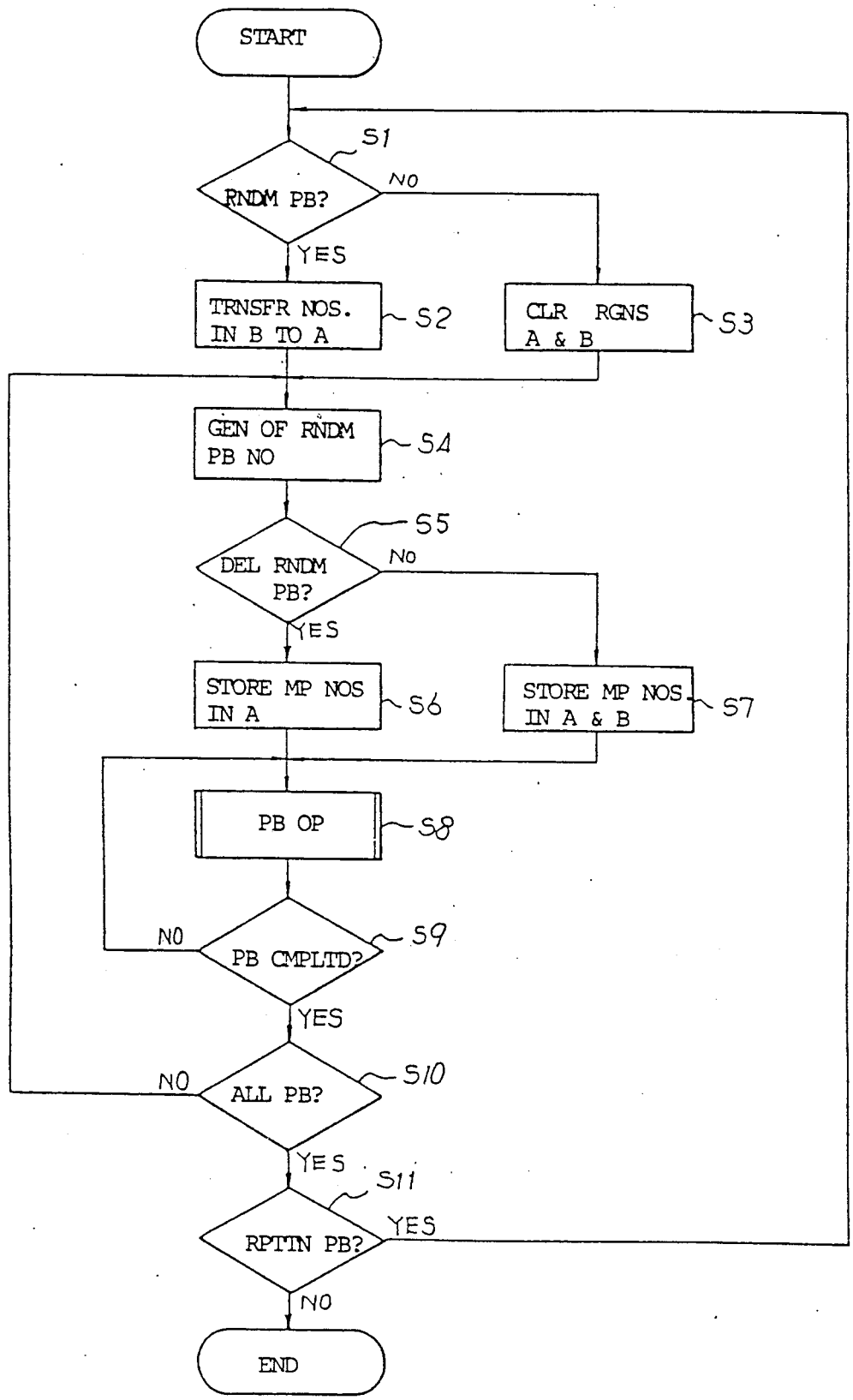
FIG. 3 is a flowchart of a program governing a system controller in the multi-disk player shown in FIG. 1 for performing a randomly-selected playbacks according to the present invention.

In a step "S1" of the flowchart shown in FIG. 3, it is first determined whether or not the deletion key 16c of the keyboard 16 of the multi-disk player shown in FIG. 1 is depressed to produce the deletion randomly-selected playback. If depressed, in the following step "S2", the data stored in the regions "B" of the memory units $17_1$ to $17_6$ are transferred to the regions "A" of the memory units $17_1$ to $17_6$ so as to be stored therein in the deletion randomly-selected playback. On the other hand, if not depressed, in the following step "S3", the entire identification numbers stored in the regions "A" and "B" of the memory units $17_1$ to $17_6$ are cleared so that the identification numbers of the pieces of music having been played back are stored in the entire regions "A" and "B" of the memory units $17_1$ to $17_6$.

After that, in the following step "S4", a subsequent piece of music to be played back is randomly selected among a plurality of pieces of music corresponding to the remaining identification numbers other than those which are stored in the regions "A" of the memory units $17_1$ to $17_6$. Then, in a step "S5", it is determined whether or not the deletion randomly-selected playback mode is performed again. In case that the deletion randomly-selected playback mode is performed again, in the following step "S6", the identification numbers of the pieces of music the number of which is within a range of 1 to 50 stored in the regions "A" of the memory units $17_1$ to $17_6$ are cleared. On the other hand, in case that the normal randomly-selected playback is to be performed, in the following step "S7", the identification numbers of the pieces of music the number of which is within a range of 1 to 99 stored in the regions "A" and "B" of the memory units $17_1$ to $17_6$ are cleared. Then, in a step "S8", the program assumes a playback mode.

When, in a step "S9", the completion of the playback for one music piece is detected, it is determined in the following step "S10" whether or not all of the pieces of music have been already played back. If there are some pieces of music still not played back, the program returns to the step "S4" so that a subsequent piece of music to be played back is randomly selected among a plurality of pieces of music the identification numbers of which are still not stored in the memory units $17_1$ to $17_6$. In case that all of the pieces of music have been already played back, it is determined in a step "S11" whether or not the repeating of the randomly-selected playback is designated. In case that the repetition of the randomly-selected playback is not designated, the playback operation is finished. On the other hand, in case that the repetition of the randomly-selected playback mode is designated, the operation is returned to the step "S1". In case that the deletion randomly-selected playback is to be repeated, the identification numbers of the pieces of music stored in the regions "B" of the memory units $17_1$ to $17_6$ are transferred to the regions "A" of the memory units $17_1$ to $17_6$ in the step "S2". In case that the normal randomly-selected playback is to be performed, the entire regions "A" and "B" of the memory units $17_1$ to $17_6$ are cleared in the step "S3". The program is repeated in such a manner as described above.

As described in the above, in case that the deletion randomly-selected playback mode is to be performed, the region of the memory units $17_1$ to $17_6$ are partitioned into two regions "A" and "B", in which region "A" are stored the identification numbers of the pieces of music having been already played back, and in which region "B" are exclusively stored the identification numbers of the undesirable pieces of music requested not to be played back. The identification numbers stored in the regions "B" are transferred to the regions "A" immediately before the randomly-selected playback mode is to be performed, whereby, the delete-designation procedure is not needed even when the randomly-selected playback mode is to be repeated.

In the above example, the method according to the present invention is carried out in the multi-disk player. However, it is also possible to carry out the method of the present invention in a single-disk player and even in a tape player.

As described above, according to the present invention, each of the regions of the memory employed in the player is partitioned into two regions "A" and "B", in which region "A" are stored the identification numbers of the pieces of music having been already played back, and in which region "B" are stored the identification numbers of the undesirable pieces of music requested not to be played back. And, immediately before the randomly-selected playback is produced, the identification numbers stored in the region "B" are transferred to the region "A" and then a subsequent piece of music to be played back is randomly selected among a plurality of pieces of music corresponding to the identification numbers other than those which are stored in the region "A". When, consequently, the randomly-selected playback mode is to be repeated, it is possible to eliminate the delete-designation procedure. Namely, without performing any repeated delete-designation procedure, the repeated randomly-selected playback can be performed.

What is claimed is:

1. A method of selecting playbacks from a plurality of pieces of music recorded on recording media the method comprising the steps of selecting said playbacks from among a plurality of pieces of music having identification numbers other than playback-inhibition identification numbers and playback-completion identification numbers stored in a memory, wherein:

said memory is provided with a first region for storing both the playback-inhibition identification numbers and the playback-completion identification numbers, and a second region for storing only the playback-inhibition identification numbers;

immediately before producing randomly-selected playbacks, the playback-inhibition identification numbers stored in said second region of said memory are transferred to said first region of said memory so as to be stored therein; and said piece of music to be subsequently played back is randomly selected from a plurality of pieces of music having identification numbers other than those stored in said first region of said memory.

2. The method for performing playbacks of the plurality of pieces of music recorded on the recording media as set forth in claim 1, wherein:

said playback-inhibition identification numbers and said playback-completion identification numbers are respectively numerical codes corresponding to pieces of music which are recorded in said recording media.

3. The method for performing playbacks of the plurality of pieces of music recorded on the recording media as set forth in claim 2, wherein:
   each of said first region and said second region is composed of a plurality of unit regions respectively corresponding to pieces of music; and
   a digit stored in said unit region represents one of said playback-inhibition identification numbers and said playback-composition identification numbers.

4. The method for performing playbacks of the plurality of pieces of music recorded on the recording media as set forth in claim 3, wherein said digit is a binary digit.

5. The method recited in claim 1 wherein after identification numbers of all the plurality of pieces of recorded music are stored in the first region of said memory, the first region of said memory is erased and the playback-inhibition identification numbers in the second region are retained to exclude pieces of music identified by said inhibition numbers from further random playback selection.

6. An apparatus for randomly selecting pieces of music from a recording medium for playback on a playback device, the apparatus comprising:
   a memory having first and second regions;
   said second region storing playback inhibition identification numbers identifying pieces of music to be excluded from playback;
   means for transferring said inhibition identification numbers from said second region to said first region;
   said first region storing playback completion identification numbers identifying those said pieces of music played, said played pieces to be excluded from repeat playback until remaining said pieces of music are played, said first region further storing playback inhibition identification numbers transferred from said second region;
   means for randomly selecting pieces of music for playback excluding those having identification numbers stored in the first region.

* * * * *